United States Patent
Helle et al.

(10) Patent No.: US 8,041,466 B2
(45) Date of Patent: Oct. 18, 2011

(54) METHOD FOR OPERATING A WIND TURBINE CONNECTED TO A UTILITY GRID DURING A UTILITY DISTURBANCE, WIND TURBINE AND WIND PARK

(75) Inventors: Lars Helle, Suldrup (DK); John Godsk Nielsen, Hornslet (DK); Mark James Jensen, Århus N (DK)

(73) Assignee: Vestas Wind Systems A/S, Randers (DK)

( * ) Notice: Subject to any disclaimer, the term of this patent is extended or adjusted under 35 U.S.C. 154(b) by 220 days.

(21) Appl. No.: 12/417,365

(22) Filed: Apr. 2, 2009

(65) Prior Publication Data

US 2009/0254223 A1 Oct. 8, 2009

Related U.S. Application Data

(63) Continuation of application No. PCT/DK2007/000423, filed on Oct. 2, 2007.

(30) Foreign Application Priority Data

Oct. 2, 2006 (DK) .................................. 2006 01275

(51) Int. Cl.
- *G05D 3/12* (2006.01)
- *H02J 3/38* (2006.01)
- *H02J 7/34* (2006.01)
- *F03D 9/00* (2006.01)
- *H02P 9/04* (2006.01)

(52) U.S. Cl. ........ 700/287; 700/286; 700/292; 700/293; 307/18; 307/19; 307/21; 307/23; 307/44; 290/44; 290/52; 290/55; 290/2

(58) Field of Classification Search .................. 700/287, 700/286, 292, 293, 294

See application file for complete search history.

(56) References Cited

U.S. PATENT DOCUMENTS

| 4,189,648 | A  | * | 2/1980  | Harner ........................... 290/44 |
| 6,566,764 | B2 | * | 5/2003  | Rebsdorf et al. ................ 290/44 |
| 6,876,176 | B2 | * | 4/2005  | Stefanovic et al. ............. 322/20 |
| 7,002,260 | B2 | * | 2/2006  | Stahlkopf ....................... 290/44 |
| 7,821,157 | B2 | * | 10/2010 | Llorente Gonzelez et al. . 307/47 |
| 2007/0085343 | A1 | * | 4/2007 | Fortmann ........................ 290/44 |

FOREIGN PATENT DOCUMENTS

| DE | 3311299 A1 | 10/1984 |
| EP | 1113560 A2 | 7/2001 |

(Continued)

OTHER PUBLICATIONS

International Search Report, Apr. 25, 2008 (2 pages).
International Preliminary Report on Patentability, Jan. 1, 2009 (9 pages).

*Primary Examiner* — Albert Decady
*Assistant Examiner* — Sunray Chang
(74) *Attorney, Agent, or Firm* — Patterson & Sheridan, LLP (57) ABSTRACT

The invention relates to a method for operating a wind turbine connected to a utility grid during a utility grid disturbance. The method comprises the steps of controlling active current in dependency of the frequency deviation from a reference frequency, and controlling reactive current in dependency of the voltage deviation from a reference voltage. The invention also relates to a wind turbine and wind park.

16 Claims, 7 Drawing Sheets

FOREIGN PATENT DOCUMENTS

| | | |
|---|---|---|
| EP | 1371846 A2 | 12/2003 |
| EP | 1384002 A2 | 1/2004 |
| EP | 1337754 B1 | 8/2004 |
| EP | 1467463 A1 | 10/2004 |
| EP | 1493921 A1 | 1/2005 |
| EP | 1508951 A1 | 2/2005 |
| WO | 0173518 A1 | 10/2001 |
| WO | 0186143 A1 | 11/2001 |
| WO | 2005099063 A1 | 10/2005 |
| WO | 2005031160 A2 | 4/2006 |

* cited by examiner

METHOD FOR OPERATING A WIND TURBINE CONNECTED TO A UTILITY GRID DURING A UTILITY DISTURBANCE, WIND TURBINE AND WIND PARK

CROSS-REFERENCE TO RELATED APPLICATIONS

The present application is a continuation of pending International patent application PCT/DK2007/000423 filed on Oct. 2, 2007 which designates the United States and claims priority from Danish patent application PA 2006 01275 filed on Oct. 2, 2006, the content of which is incorporated herein by reference.

FIELD OF THE INVENTION

The invention relates to a method for operating a wind turbine connected to a utility grid during a utility grid disturbance, wind turbine and wind park.

BACKGROUND OF THE INVENTION

When a wind turbine generator or wind park connected to the utility grid in a point of common connection (PCC) experiences a disturbance on said grid e.g. a voltage drop, it always has a major impact on the operation and control of the wind turbine and/or wind park.

In order to support the grid during said disturbance, recent grid codes require that different power parameters is controlled according to the severeness of the grid disturbance.

Various methods have been suggested for controlling wind turbines during the grid disturbance. European patent no. EP 1 493 921 discloses an example of a method for controlling the phase angle between active and reactive power in dependency of measured voltage level.

A problem with the solutions of the above mentioned EP-patent is that it may not sufficiently support the utility grids during utility grid disturbances due to the complexity of said disturbances.

It is an object of the present invention to describe a flexible strategy for operating a wind turbine during a disturbance on the utility grid.

SUMMARY OF THE INVENTION

The invention provides a method for operating a wind turbine connected to a utility grid during a utility grid disturbance, said method comprises the steps of:

controlling active current in dependency of the frequency deviation from a reference frequency, and controlling reactive current in dependency of the voltage deviation from a reference voltage.

Hereby it is ensured that the generated active power/current from the turbine helps in stabilizing the utility grid frequency and the generated reactive power/current from the turbine helps in stabilizing the utility grid voltage. Furthermore it is ensured that the wind turbine stay connected to the utility grid during said grid disturbance. Further it is ensured that the wind turbine comply with defined grid codes.

In one aspect of the invention active and/or reactive current is supplied to the utility grid connection point of the wind turbine by other types of sources beyond the wind turbine. Hereby it is ensured that power produced by other types of sources is controllable supplied to the utility grid during said grid disturbance. Other types of sources can e.g. be capacitor banks, diesel generators etc.

In another aspect of the invention said controlling of active and reactive current is executed after at least one control algorithm. Hereby it is ensured that said control can be done e.g. on the basis of actual measured parameters producing an optimal control of said currents.

In another aspect of the invention said control algorithm is implemented in at least one PID controller. Hereby it is ensured that the control is managed by well known and reliable methods.

In another aspect of the invention said control algorithm is:

$$\Delta i_Q = \sum_{n=0}^{\infty} kp_n \Delta f^n + \sum_{n=0}^{\infty} ki_n \left( \int \Delta f dt \right)^n + \sum_{n=0}^{\infty} kd_n \left( \frac{df}{dt} \right)^n$$

$$\Delta i_D = \sum_{n=0}^{\infty} kp_n \Delta U^n + \sum_{n=0}^{\infty} ki_n \left( \int \Delta U dt \right)^n + \sum_{n=0}^{\infty} kd_n \left( \frac{dU}{dt} \right)^n$$

where $i_Q$ is the active current and $i_D$ is the reactive current.

Hereby it is ensured that controlling of the wind turbine can be adapted to fulfil many specific demands in a flexible way, depending of the coefficients of said control algorithm. Furthermore it is ensured that the control algorithm can be adapted to fulfil the compliance with various grid codes.

In another aspect of the invention values of drive train oscillations $\Delta\omega$ are additional control parameters of said active current control. Hereby it is ensured that mechanical oscillations of the drive train, triggered by the grid fault event, can be damped resulting in a reduction in mechanical loads on said drive train. Furthermore it is ensured that also other types of oscillations of the drive train can be damped.

In another aspect of the invention said control algorithm is:

$$\Delta i_Q = \sum_{n=0}^{\infty} kp_n \Delta f^n + \sum_{n=0}^{\infty} ki_n \left( \int \Delta f dt \right)^n + \sum_{n=0}^{\infty} kd_n \left( \frac{df}{dt} \right)^n + k_\omega \Delta\omega$$

$$\Delta i_D = \sum_{n=0}^{\infty} kp_n \Delta U^n + \sum_{n=0}^{\infty} ki_n \left( \int \Delta U dt \right)^n + \sum_{n=0}^{\infty} kd_n \left( \frac{dU}{dt} \right)^n$$

and where $i_Q$ is the active current and $i_D$ is the reactive current.

Hereby it is ensured that damping of said drive train oscillations can be optimized depending of the coefficients of said control algorithm.

In another aspect of the invention said active current is controlled in dependency of the frequency deviation outside of a frequency dead band comprising a reference frequency. Hereby it is ensured that the active current only is controlled/regulated if said grid disturbance has a greater impact on the frequency of the grid.

In another aspect of the invention said reactive current is controlled in dependency of the voltage deviation outside of a voltage dead band comprising a reference voltage. Hereby it is ensured that the reactive current, during a grid disturbance, only is controlled/regulated if said grid disturbance comprise a greater voltage drop and/or that said control/regulation only is executed if said voltage drop has a greater impact on the operation of said wind turbine.

In another aspect of the invention said frequency dead band is in the range of ±4% from said reference frequency e.g. 49.8 Hz to 50.2 Hz in a 50 Hz system. Hereby it is ensured that said frequency dead band comply with existing grid codes.

In another aspect of the invention said voltage dead band is in the range of 100% to 85% of said reference voltage, preferably in the range of 100% to 90% of said reference voltage.

In another aspect of the invention said reference values of voltage and/or frequency are utility grid nominal values e.g. a nominal frequency value of 50 or 60 Hz. Hereby it is ensured that said invention comply with the utility grid to which the wind turbine is connected. Furthermore it is ensured that said invention comply with specified grid codes.

The invention also relates to a wind turbine connected to a utility grid during a utility grid disturbance comprising control means for controlling the wind turbine with a method according to any of the preceding claims.

In another aspect of the invention said wind turbine comprise a variable speed generator and at least one converter system to control active and/or reactive current supplied to the utility grid.

The invention also relates to a wind park comprising at least two wind turbines.

BRIEF DESCRIPTION OF THE DRAWINGS

The invention will be described in the following with reference to the figures in which.

DETAILED DESCRIPTION OF THE INVENTION

Figure 1:
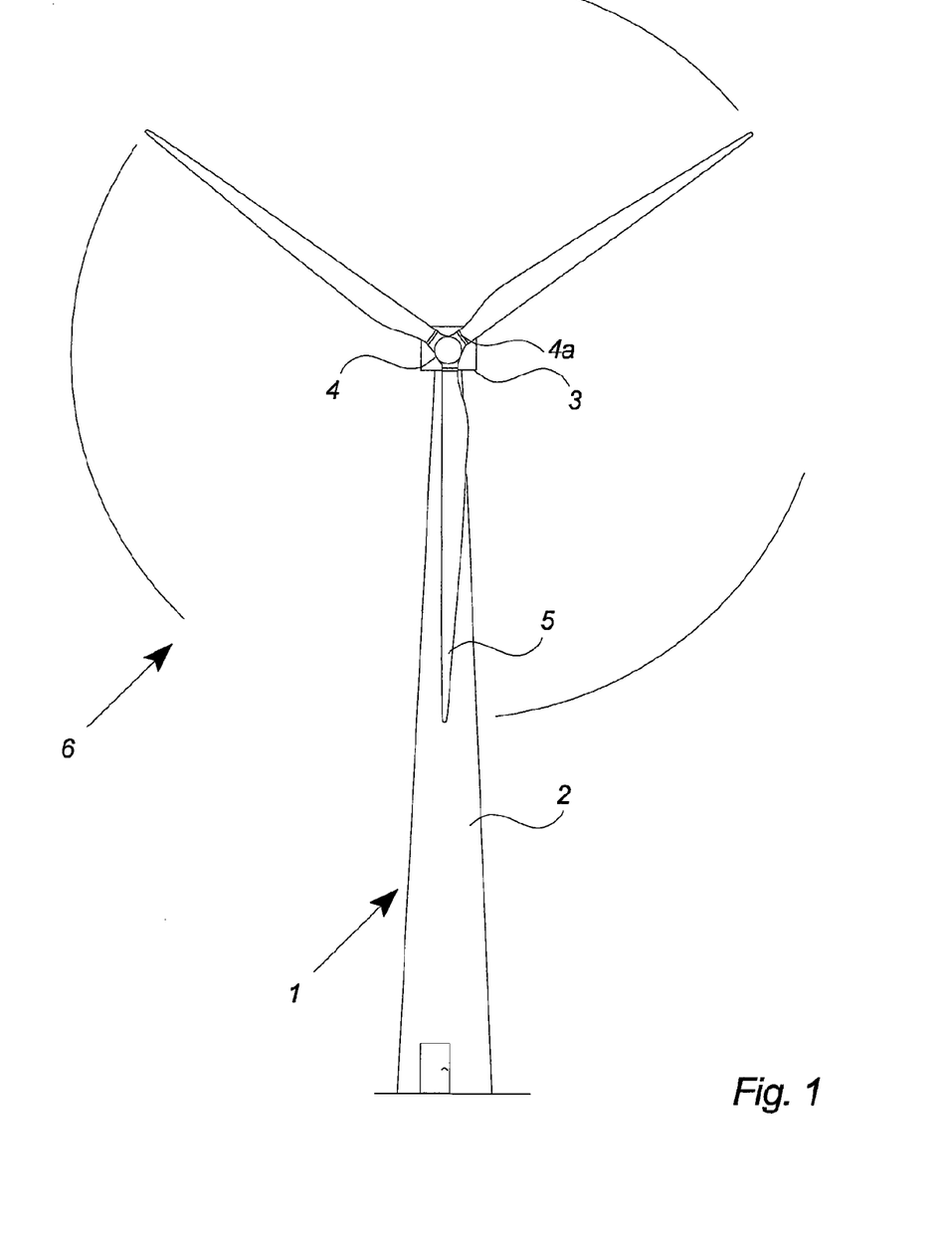
FIG. 1 illustrates a large modern wind turbine including three wind turbine blades in the wind turbine rotor.

FIG. 1 illustrates a modern wind turbine 1 with a tower 2 and a wind turbine nacelle 3 positioned on top of the tower.

The wind turbine rotor, comprising at least one blade such as three wind turbine blades 5 as illustrated, is connected to the hub 4 through pitch mechanisms 6. Each pitch mechanism includes a blade bearing and pitch actuating means which allows the blade to pitch. The pitch process is controlled by a pitch controller.

As illustrated in the figure, wind over a certain level will activate the rotor and allow it to rotate in a perpendicular direction to the wind. The rotation movement is converted to electric power which usually is supplied to the utility grid as will be known by skilled persons within the area.

Figure 2:
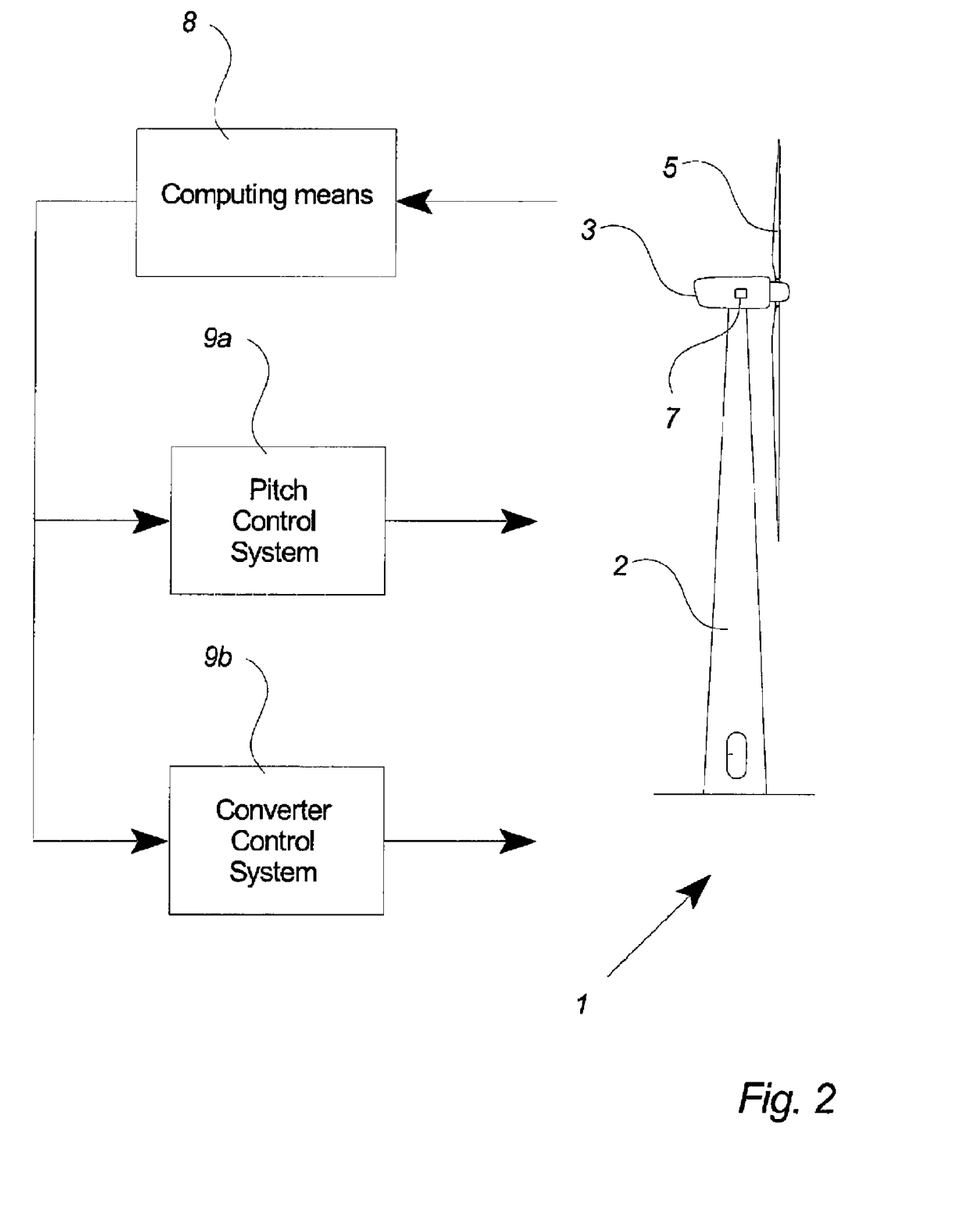
FIG. 2 illustrates schematically a preferred embodiment according to the invention of a wind turbine with a control system for controlling the pitch angles of the wind turbine blades.

FIG. 2 illustrates schematically one preferred embodiment of a wind turbine with a control system, or controller, for controlling the operation of a wind turbine.

Data of the wind turbine 1 are measured e.g. with sensor means 7 located in the nacelle 3 such as pitch position sensors, blade load sensors, rotor azimuth sensors, tower acceleration sensors etc. The measured sensor data are supplied to computing means 8 in order to convert the data to feedback signals. The feedback signals are used in various control systems e.g. the pitch control system 9a for controlling the pitch angle by establishing control values for controlling said at least one wind turbine blade 5.

Furthermore sensor means (not illustrated) can comprise means for measuring parameters of components or systems connected to said wind turbine such as actual supplied power and/or current to a utility grid, actual frequency of the grid or like. Said measured parameters are also supplied to computing means 8 in order to convert the data to feedback signals used for the control of e.g. a wind turbine converter control system.

The computing means 8 preferably includes a microprocessor and computer storage means for continuous control of the said feedback signal.

Since many grid disturbances are caused by short circuits somewhere in the utility grid resulting in excessive power consumption (dissipation), the grid disturbance may influence both the voltage level in PCC and the frequency of said grid.

As the frequency in the utility grid is determined/influenced solely by the balance between active power production and active power consumption, the generated active power/current from the turbine helps in stabilizing the utility grid frequency whereas the voltage in the PCC is mainly influenced by the reactive power/current generated by the wind turbine/wind park.

Figure 3:
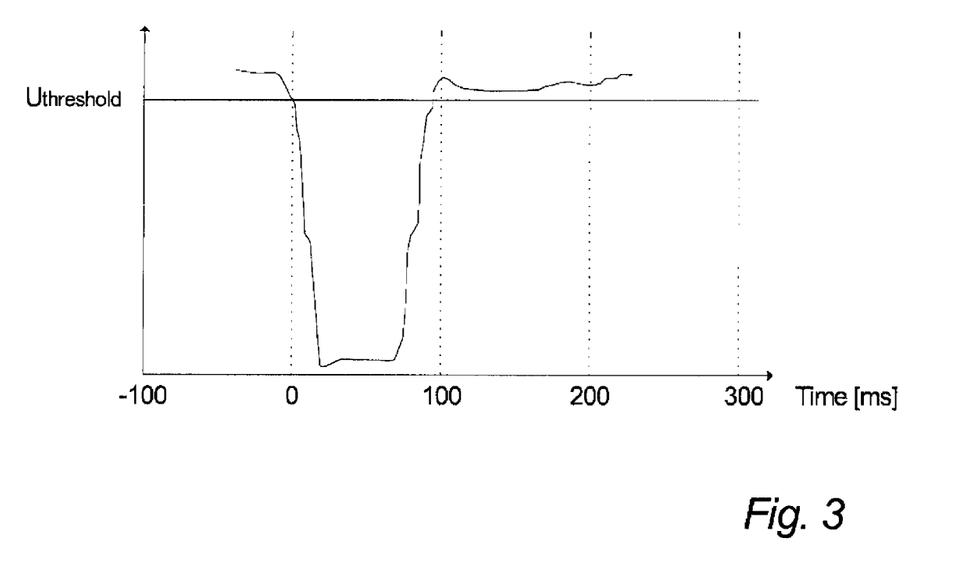
FIG. 3 illustrates as an example a voltage/time curve illustrating an realistic voltage dip on the grid.

FIG. 3 illustrates an example of a voltage vs. time curve illustrating a realistic grid fault event.

Since many grid disturbances are caused by short circuits somewhere in the utility grid resulting in excessive power consumption (dissipation), the grid disturbance may influence both the voltage level in PCC and the frequency of said grid.

As the frequency in the utility grid is determined/influenced solely by the balance between active power production and active power consumption, the generated active power/current from the turbine helps in stabilizing the utility grid frequency whereas the voltage in the PCC is mainly influenced by the reactive power/current generated by the wind turbine/wind park.

For the shown example, time=0 when the voltage drops to below a $U_{threshold}$ of e.g. 85% of nominal. For this example the grid fault lasts approx. 100 ms as indicated on the figure. It is important for the operation of a wind turbine that it is able to stay connected to the grid during said fault event in order to continuously supply power to the grid.

Figure 4:
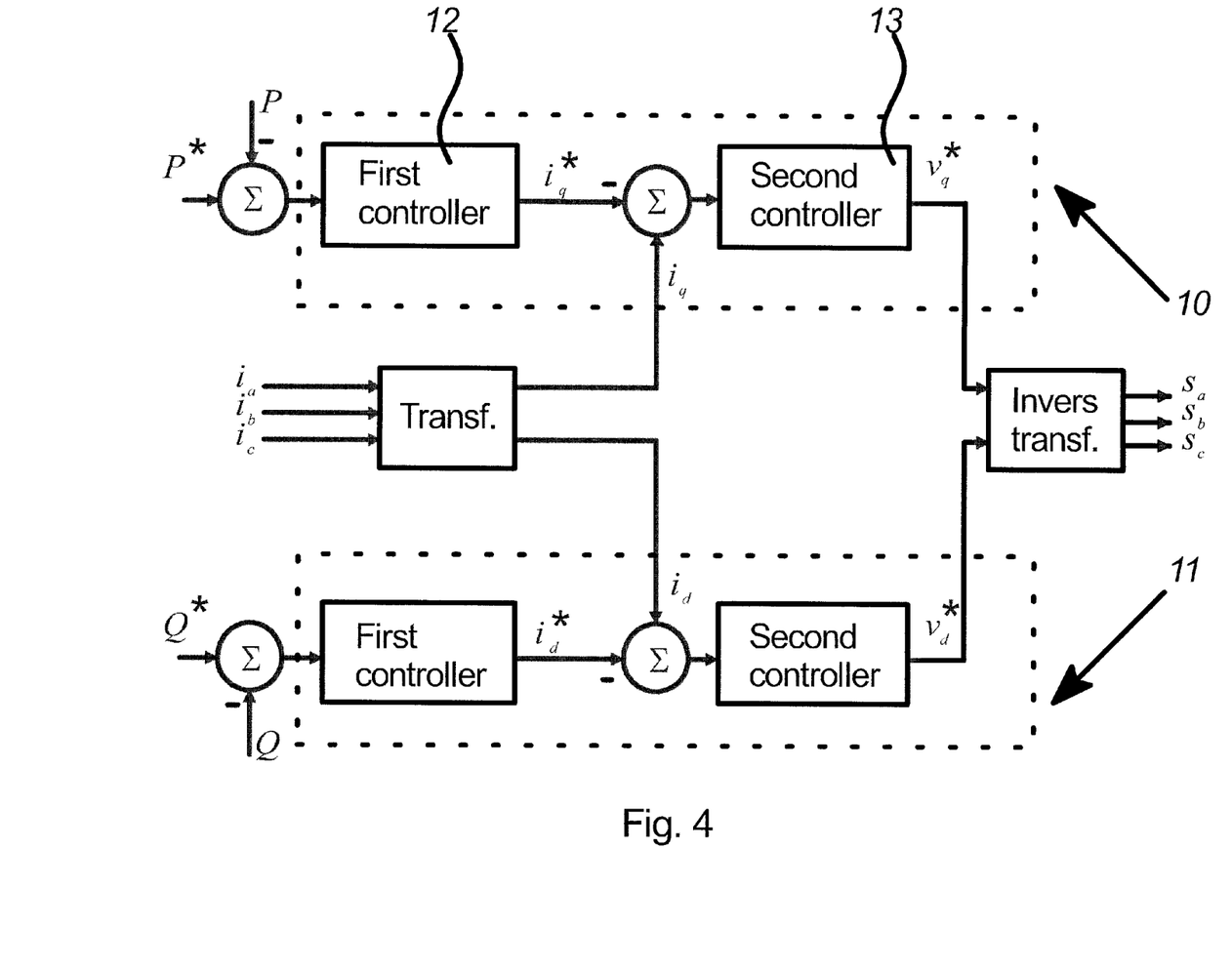
FIG. 4 illustrates for one preferred embodiment of the invention the active and reactive current controller during normal operation i.e. no grid disturbance.
Figure 5:
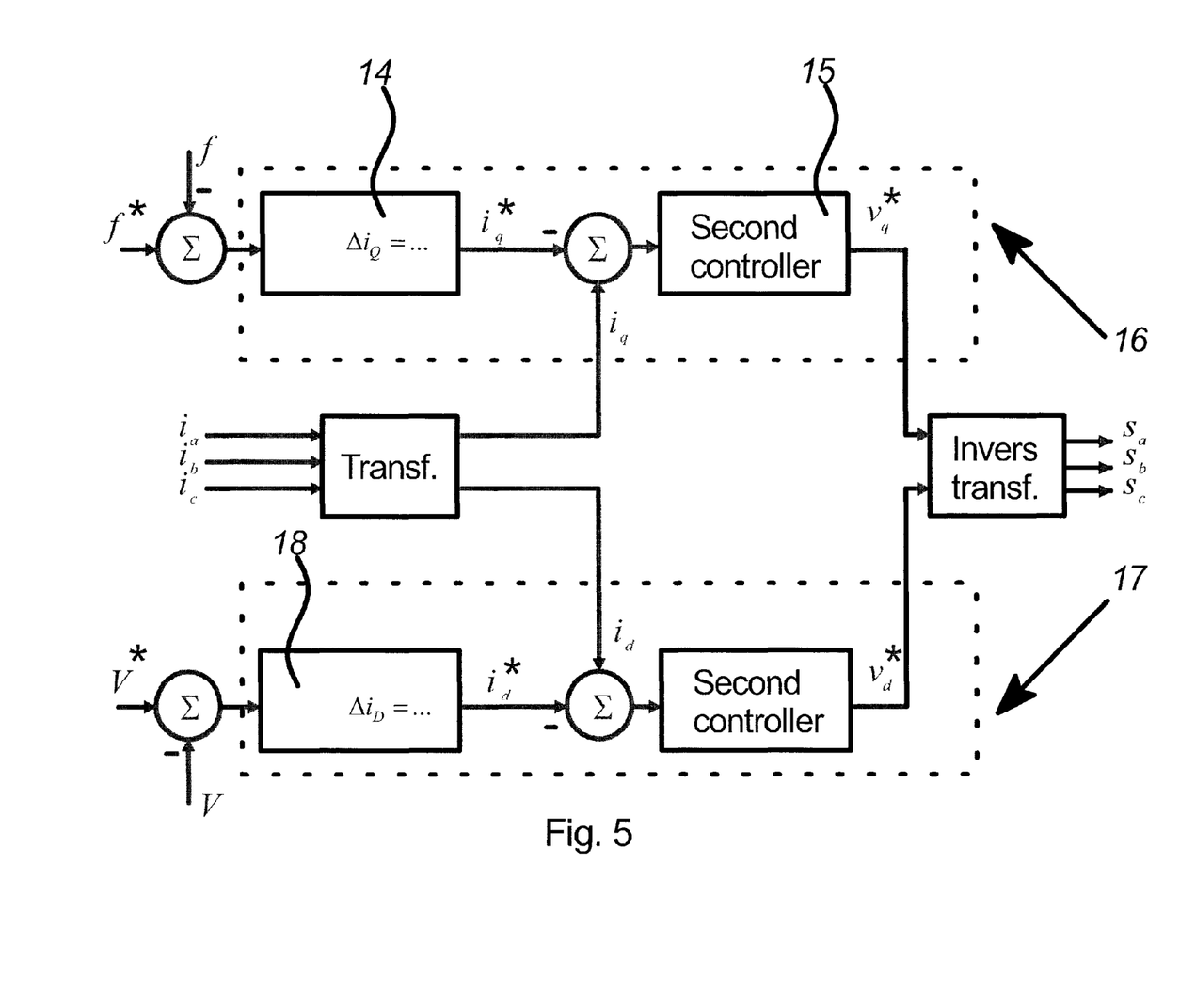
FIG. 5 illustrates for a preferred embodiment of the invention the active and reactive current controller during a grid disturbance.

With reference to FIG. 4 and FIG. 5:

P*, Q* are reference active and reactive power demands respectively defined by an external control structure such as external wind turbine control, grid operator etc.

P, Q are measured active and reactive power respectively supplied to the utility grid.

f* is a reference frequency defined by an internal generated frequency generator with a frequency of e.g. 50 or 60 Hz or defined by external control structure such as external wind turbine control, grid operator etc.

f is the measured frequency of the grid.

V* is a reference voltage e.g. defined externally such as by a grid operator, an external control structure or a fixed defined value.

V is the measured voltage of the grid.

ia, ib, ic are the measured 3-phase current supplied to the grid.

iq*, id* are demanded active and reactive currents respectively from a power controller iq, id are the measured active and reactive currents respectively supplied to the grid, transformed from said 3-phase current.

vq*, vd* are regulated voltage references.

Sa, Sb, Sc are regulated 3-phase control signals to a converter.

FIG. 4 illustrates for one embodiment of the invention the power control system during normal operation i.e. without utility grid disturbance.

Said power control system is preferably implemented on a microprocessor based system, executing preprogrammed algorithms for regulating a set of output parameters on the basis of sets of input parameters.

For one embodiment of the invention the active power control system 10 is operated in the following way:

The difference (error) between the actual supplied power P and the demanded P* is fed to a first controller 12 providing a demanded current signal iq*. Said iq* is in turn subtracted from a signal iq representing the measured active current supplied to the grid. The result is a current regulation signal that is supplied to a second controller 13 producing a regulated voltage reference signal vq*. The signal iq is a transformation of actual measured 3-phase current supplied to the grid ia, ib, ic. Said vq* undergoes an inverse transformation (in combination with a similar regulated voltage reference signal for the control of reactive power vd*) in order to create regulated 3-phase control signals to a converter system Sa, Sb, Sc that controls the active and reactive current supplied to the grid. Said converter system can be e.g. a full scale converter for a synchron generator or a rotor side converter for a double-fed asynchron generator.

The coefficients for said first 12 and second 13 controllers are chosen as to give a desired active power control system 10 response on the basis of its input.

A similar control structure 11 applies to the control of reactive power, but with another set of control parameters e.g. the actual supplied reactive power Q, the demanded reactive power Q* and the measured reactive current supplied to the grid id.

FIG. 5 illustrates for one embodiment of the invention the control structure for controlling the active and reactive current respectively supplied to the grid during a utility grid disturbance.

As set up in the claims, controlling active current is done in dependency of the frequency deviation from a reference frequency and controlling reactive current is done in dependency of the voltage deviation from a reference voltage. Frequency and voltage parameters are therefore used as control parameters to the current control system during said disturbance.

For one preferred embodiment of the invention the control of active current is performed in the following way:

The difference (error) between the actual measured frequency of the grid f and the demanded frequency reference f* is fed to a first controller 14 providing a demanded current signal iq*. Said iq* is in turn subtracted from a signal iq representing the measured active current supplied to the grid. The result is a current regulation signal that is supplied to a second controller 15 producing a regulated voltage reference signal vq*. The signal iq is a transformation of actual measured 3-phase current supplied to the grid ia, ib, ic. Said vq* undergoes an inverse transformation (in combination with a similar regulated voltage reference signal for the control of reactive power vd*) in order to create regulated 3-phase control signals to a converter system Sa, Sb, Sc that controls the active and reactive current supplied to the grid.

The coefficients for said first 14 and second 15 controllers are chosen as to give a desired active current control system 16 response on the basis of its input.

A similar control structure 17 applies to the control of reactive current, but with another set of control parameters e.g. the actual grid voltage v, a reference grid voltage v* and the measured reactive current supplied to the grid id.

For one preferred embodiment of the invention the implementation of said current controller during a utility grid disturbance comprise control algorithms for said first controllers 14, 18 on the form of:

$$\Delta i_Q = \sum_{n=0}^{\infty} kp_n \Delta f^n + \sum_{n=0}^{\infty} ki_n \left( \int \Delta f dt \right)^n + \sum_{n=0}^{\infty} kd_n \left( \frac{df}{dt} \right)^n$$

$$\Delta i_D = \sum_{n=0}^{\infty} kp_n \Delta U^n + \sum_{n=0}^{\infty} ki_n \left( \int \Delta U dt \right)^n + \sum_{n=0}^{\infty} kd_n \left( \frac{dU}{dt} \right)^n$$

For another preferred embodiment of the invention, the control algorithm for regulating the active current during a utility grid disturbance furthermore comprises a sequence as to damp the mechanical oscillations in the drive train triggered by said grid disturbance. For this embodiment said first controller 14 comprises a control algorithm for regulating the active current on the form of:

$$\Delta i_Q = \sum_{n=0}^{\infty} kp_n \Delta f^n + \sum_{n=0}^{\infty} ki_n \left( \int \Delta f dt \right)^n + \sum_{n=0}^{\infty} kd_n \left( \frac{df}{dt} \right)^n + k_\omega \Delta \omega$$

For this embodiment said first controller 14 receives an input signal representing said oscillations in the drive train.

Figure 6:
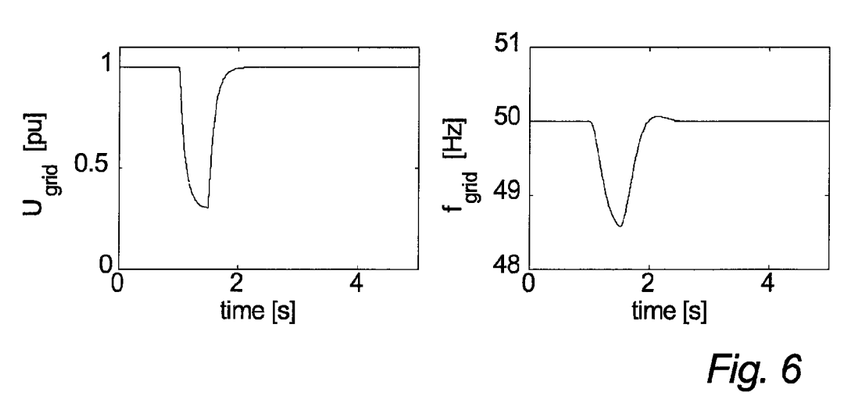
FIG. 6 illustrates a simulated grid disturbance comprising a voltage dip and a frequency dip.
Figure 7A:
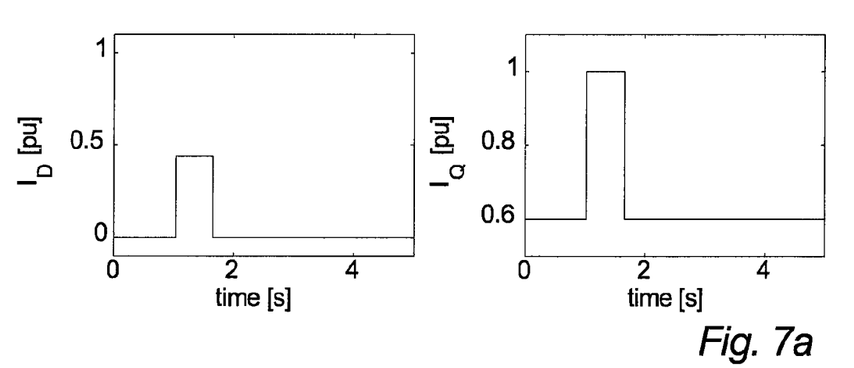
FIGS. 7a-e illustrate the response of different embodiments of the active and reactive current controllers during a grid disturbance.
Figure 7B:
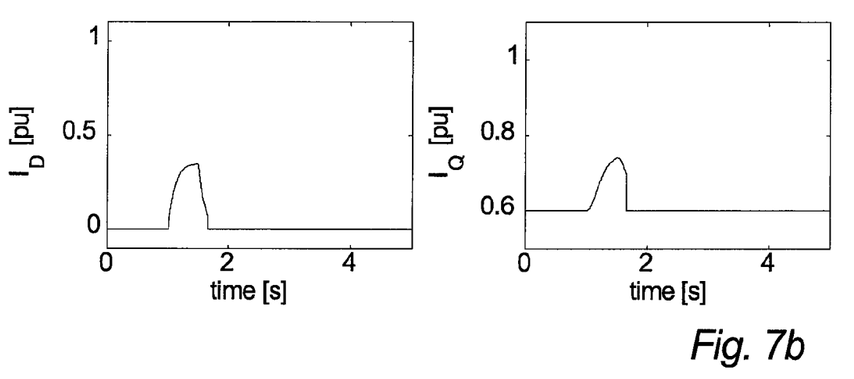
Figure 7C:
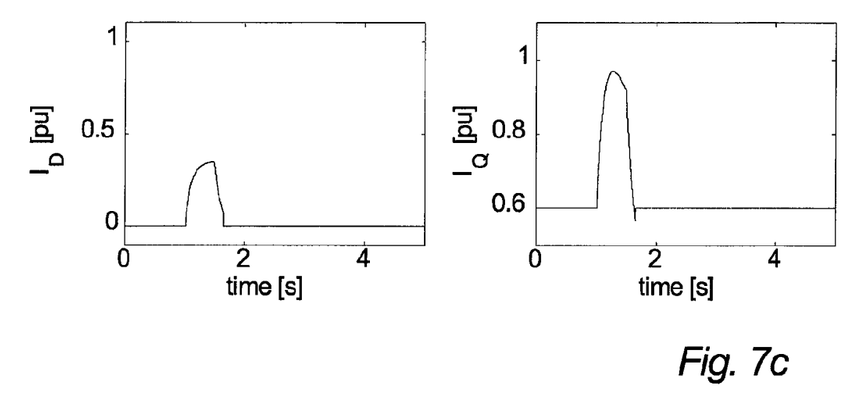
Figure 7D:
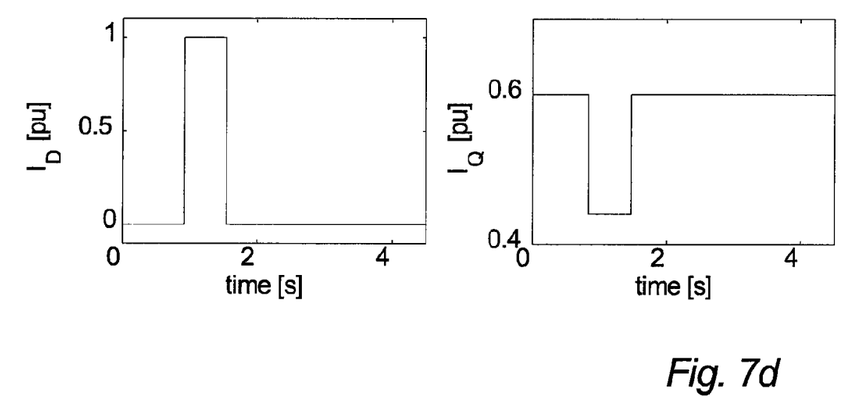
Figure 7E:
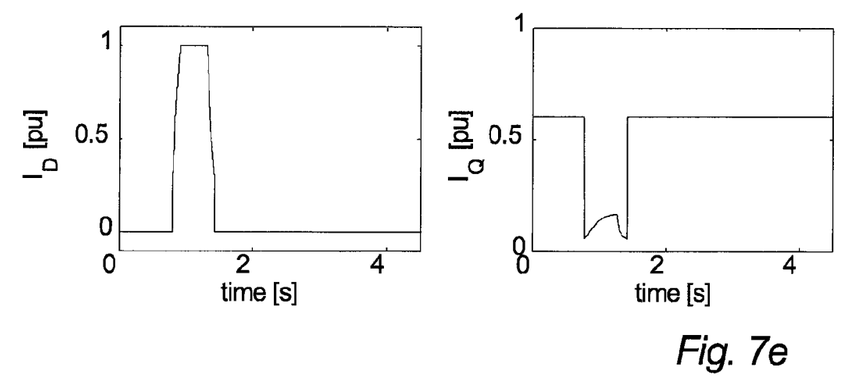

FIGS. 7a-e illustrate simulated responses for different embodiments of the invented current controller under influence of a simulated grid disturbance as shown in FIG. 6.

The grid disturbance as simulated in FIG. 6 comprises a voltage dip and a frequency dip starting at time=1 [s].

Table 1 and Table 2 list the coefficients for said first controllers 14, 18 for different embodiments of the invention. Table 1 shows the coefficients for the active current first controller 14 whereas Table 2 shows the coefficients for the reactive current first controller 18.

TABLE 1

Active current first controller coefficients

| Embodiment | kp0 | kp1 | Kpx (x > 1) | kix (x >= 0) | kd1 | kdx (x ≠ 1) | kω |
|---|---|---|---|---|---|---|---|
| #1 | 1 | 0 | 0 | 0 | 0 | 0 | 0 |
| #2 | 0 | 0.5 | 0 | 0 | 0 | 0 | 0 |
| #3 | 0 | 0.2 | 0 | 0 | 0.05 | 0 | 0 |
| #4 | 0.44 | 0 | 0 | 0 | 0 | 0 | 0 |
| #5 | $\frac{P_{const}}{U_{grid}}$ | 0 | 0 | 0 | 0 | 0 | 0 |

TABLE 2

Reactive current first controller coefficients

| Embodiment | kp0 | kp1 | kpx (x > 1) | Kix (x >= 0) | kd1 | kdx (x ≠ 1) |
|---|---|---|---|---|---|---|
| #1 | 0.44 | 0 | 0 | 0 | 0 | 0 |
| #2 | 0 | 0.1 | 0 | 0 | 0 | 0 |
| #3 | 0 | 0.5 | 0 | 0 | 0 | 0 |
| #4 | 1 | 0 | 0 | 0 | 0 | 0 |
| #5 | 0 | 2 | 0 | 0 | 0 | 0 |

The present invention relates to any type of wind turbine comprising a generator and one or more converter systems to control active and reactive power and/or active and reactive current supply to a utility grid such as a full scale converter for a synchronous- or asynchronous generator or a rotor side converter for a double-fed asynchron generator.

The invention claimed is:

1. A method for operating a wind turbine connected to a utility grid during a utility grid disturbance, said method comprises the steps of:
   calculating a deviation in active current as a function of grid frequency and a reference frequency;
   controlling generated active current from the turbine in dependency of said calculated active current deviation,
   calculating a deviation in reactive current as a function of grid voltage and a reference voltage; and
   controlling generated reactive current from the turbine in dependency of said calculated reactive current deviation.

2. The method for operating a wind turbine according to claim 1, wherein at least one of active current and reactive current is supplied to a utility grid connection point of the wind turbine by other types of sources beyond the wind turbine.

3. The method for operating a wind turbine according to claim 1, wherein said controlling of at least one of active current and reactive current is executed after at least one control algorithm.

4. The method for operating a wind turbine according to claim 3, wherein said control algorithm is implemented in at least one PID controller.

5. The method for operating a wind turbine according to claim 3, wherein said control algorithm is:

$$\Delta i_Q = \sum_{n=0}^{\infty} kp_n \Delta f^n + \sum_{n=0}^{\infty} ki_n \left( \int \Delta f \, dt \right)^n + \sum_{n=0}^{\infty} kd_n \left( \frac{df}{dt} \right)^n$$

$$\Delta i_D = \sum_{n=0}^{\infty} kp_n \Delta U^n + \sum_{n=0}^{\infty} ki_n \left( \int \Delta U \, dt \right)^n + \sum_{n=0}^{\infty} kd_n \left( \frac{dU}{dt} \right)^n$$

and where $i_Q$ is the active current and $i_D$ is the reactive current.

6. The method for operating a wind turbine according to claim 1, wherein values of drive train oscillations ($\Delta\omega$) are additional control parameters of said active current control.

7. The method for operating a wind turbine according to claim 6, wherein said algorithm is:

$$\Delta i_Q = \sum_{n=0}^{\infty} kp_n \Delta f^n + \sum_{n=0}^{\infty} ki_n \left( \int \Delta f \, dt \right)^n + \sum_{n=0}^{\infty} kd_n \left( \frac{df}{dt} \right)^n + k_\omega \Delta\omega$$

$$\Delta i_D = \sum_{n=0}^{\infty} kp_n \Delta U^n + \sum_{n=0}^{\infty} ki_n \left( \int \Delta U \, dt \right)^n + \sum_{n=0}^{\infty} kd_n \left( \frac{dU}{dt} \right)^n$$

and where $i_Q$ is the active current and $i_D$ is the reactive current.

8. The method for operating a wind turbine according to claim 1, wherein said active current is controlled in dependency of a frequency deviation outside of a frequency dead band comprising the reference frequency.

9. The method for operating a wind turbine according to claim 8, wherein said frequency dead band is in a range of ±4% from said reference frequency.

10. The method for operating a wind turbine according to claim 1, wherein said reactive current is controlled in dependency of a voltage deviation outside of a voltage dead band comprising the reference voltage.

11. The method for operating a wind turbine according to claim 10, wherein said voltage dead band is in a range of 100% to 85% of said reference voltage.

12. The method for operating a wind turbine according to claim 11 wherein said voltage dead band is in a range of 100% to 90% of said reference voltage.

13. The method for operating a wind turbine according to claim 1, wherein said reference voltage and said reference frequency are utility grid nominal values.

14. A wind turbine connected to a utility grid during a utility grid disturbance comprising control means for controlling the wind turbine with a method according to claim 1.

15. The wind turbine according to claim 14 comprising a variable speed generator and at least one converter system to control at least one of active current and reactive current supplied to the utility grid.

16. A wind park comprising at least two turbines according to claim 14.

* * * * *